United States Patent
Feng et al.

(12) 
(10) Patent No.: US 6,697,169 B1
(45) Date of Patent: Feb. 24, 2004

(54) ENHANCED ERROR DIFFUSION USING A CORRELATED CHROMATIC NOISE PATTERN

(75) Inventors: Xiaofan Feng, Vancouver, WA (US); Jon Mathew Speigle, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/458,115

(22) Filed: Dec. 8, 1999

(51) Int. Cl.[7] .............................................. G06K 15/02
(52) U.S. Cl. ..................................... 358/3.04; 358/3.03
(58) Field of Search .......................... 358/1.9, 3.03–3.05, 358/3.13–3.15, 3.19, 515–518, 527; 382/237, 252, 270

(56) References Cited

U.S. PATENT DOCUMENTS

| | | |
|---|---|---|
| 5,014,333 A | 5/1991 | Miller et al. |
| 5,150,429 A | 9/1992 | Miller et al. |
| 5,313,287 A | 5/1994 | Barton |
| 5,325,211 A | 6/1994 | Eschbach |
| 5,331,429 A | 7/1994 | Levien |
| 5,341,228 A | 8/1994 | Parker et al. |
| 5,493,416 A | 2/1996 | Fan |
| 5,535,020 A | 7/1996 | Ulichney |
| 5,543,941 A * | 8/1996 | Parker et al. ............... 358/534 |
| 5,570,461 A | 10/1996 | Yokomizo |
| 5,621,476 A | 4/1997 | Makita et al. |
| 5,642,204 A | 6/1997 | Wang |
| 5,673,121 A | 9/1997 | Wang |
| 5,682,442 A | 10/1997 | Johnston et al. |
| 5,712,927 A | 1/1998 | Kim et al. |
| 5,737,453 A | 4/1998 | Ostromoukhov |
| 5,809,177 A | 9/1998 | Metcalfe et al. |
| 5,838,885 A | 11/1998 | Shu et al. |
| 6,020,978 A * | 2/2000 | Cooper et al. ............... 358/1.9 |
| 6,474,766 B1 * | 11/2002 | Cooper ......................... 347/15 |
| 6,543,870 B1 * | 4/2003 | Kakutani ...................... 347/15 |

OTHER PUBLICATIONS

Billotet–Hoffman et al., *On the error diffusion technique for electronic halftoning*, Proceedings of the SID, vol. 24/3, 1983.

Eschbach, *Error Diffusion Algorithm with Reduced Artifacts*, Recent Progress in Digital Halftoning, Proceedings of the IS&T, 45th Annual Conference, pp171–173, May, 1992.

* cited by examiner

*Primary Examiner*—Thomas D. Lee
*Assistant Examiner*—Stephen Brinich
(74) *Attorney, Agent, or Firm*—Robert D. Varitz, P.C.

(57) ABSTRACT

A method for reproducing a continuous-tone image in a reduced medium includes a comparison step, a diffusing step, and determining a threshold value for the comparison step from a matrix of threshold values, wherein the matrix has a spatial-chromatic correlated noise pattern.

15 Claims, 4 Drawing Sheets

ENHANCED ERROR DIFFUSION USING A CORRELATED CHROMATIC NOISE PATTERN

FIELD OF THE INVENTION

This invention-relates to color image processing, and specifically to color halftoning for digital printing and copying using error diffusion techniques.

BACKGROUND OF THE INVENTION

Halftoning is a technique whereby a multilevel greyscale or color image may be rendered for a printing or display mechanism that is capable of presenting a reduced number of distinct color levels. Halftoning for target devices where dots are either "on" or "off" is referred to as "binary halftoning" because only two levels of each colorant exist. In monochromatic binary halftoning, the rendered image is represented as a collection of black dots on a white background, with the dots being dense in regions of the image that are dark, and sparse in regions of the image that are light. Conversion of a color or continuous greyscale image into a halftoned image requires that the image be sampled, and that a scheme for converting the continuous sampled information be provided. During this process, unwanted patterns may be generated, which patterns need to be eliminated if the final image is to be an accurate and acceptable representation of the original image.

Error diffusion (ED) techniques have been used in digital printing for many years in an attempt to eliminate digitally generated patterns that are perceptible to the human visual system (HVS), however, the complete elimination of these undesirable artifacts has been a problem and has been the focus of much research. Many of the proposed solutions involve systematically modulating the threshold of the error diffusion process rather than holding it constant for the entire image, in fact, the primary way in which the various proposed solutions differ is in how the threshold is modulated.

A number of electronic halftoning techniques are described in Billotet-Hoffinan et al., *On the error diffusion technique for electronic halftoning*, Proceedings of the SID, Vol. 24/3, 1983. This paper describes hybrid error diffusion techniques wherein the threshold is modulated according to a dither function. Diamond-shaped, Bayer, and ring-shaped dither functions are used, which resulted in the reduction of tendency of the generation of regular textures following error diffusion.

Robert Ulichney, "Digital Halftoning", MIT Press, 1988, proposes adding random noise to the entire image to defeat the visual artifacts discussed above, however, adding noise, such as the 'blue' noise suggested in the paper, to all parts of an image tends to increase graininess.

U.S. Pat. No. 5,014,333, to Miller et al., for Image processor with smooth transitioning between dither and diffusion processes, granted May 7, 1991, discloses an error-diffusion halftoning method wherein a periodic ordered dither matrix is used to define spatially-varying threshold values. The reference describes attenuating the propagated errors in very light and very dark areas. The magnitude of threshold modulation is based on the content of the original image, and the dither matrices vary with the frequency content of the input image, to effect a smooth transition between dither and diffusion processes.

U.S. Pat. No. 5,150,429 to Miller et al., for Image processor with error diffusion modulated threshold matrix, granted Sep. 2, 1992, discloses another error-diffusion halftoning method wherein the threshold matrix is systematically modulated. In, this case, the threshold-modulating pattern is complementary to the known artifact pattern of error diffusion processes. The reference describes a threshold matrix which has sparse threshold modulations arranged along lines that are approximately orthogonal to the prevailing orientation of the worming patterns.

Eschbach, *Error Diffusion Algorithom with Reduced Artifacts*, Proceedings of the IS&T, 45th Annual Conference, May 10–15, 1992, pp. 171–173, describes two different error distribution matrices, one for highlights and one for midtones, which alleviated the dominant artifacts in each input range. Eschbach asserts that in highlights, the worm-like structures are greatly reduced by means of a modified error-dittusion matrix. Transition artifacts due to switching weight matrices may be avoided by randomizing the location of the transition boundary.

U.S. Pat. No. 5,313,287 to Barton, for Imposed weight matrix error diffusion halftoning of image data, granted May 17, 1994, discloses an error-diffusion halftoning method where the direction of processing scan lines of a source image is selected with blue noise, i.e., such that the direction of processing is biased away from long streaks in the same direction, in order to reduce directional and start-up anomalies. "Serpentine", "peano", and other pixel-visitation strategies are also suggested. The pixel values are modified according to a spatially-repeating pattern prior to thresholding. Error diffusion threshold values are modulated with blue noise. Because of the effects of the blue noise, it is possible to distribute the error using a special three-weight filter as opposed to the more traditional larger distribution filters.

U.S. Pat. No. 5,737,453 to Ostromoukhov, for Enhanced error-diffusion method for color or black-and-white reproduction, granted Apr. 7, 1998 describes an error diffusion method in which the threshold is modulated according to a 2D pattern and different diffusion matrices are used for different gray levels. The threshold-modulating pattern is obtained by applying standard error diffusion, with a fixed threshold of 0.5, to a constant gray level image. The constant gray-level image has certain properties, i.e., the gray level is an irrational number, and the resulting threshold-modulating pattern is largely artifact-free.

U.S. Pat. No. 5,809,177 to Metcalfe et al., for Hybrid error diffusion pattern shifting reduction using programmable threshold perturbation, granted Sep. 15, 1998, discloses a method of selectively adding noise based on the input gray level. The input gray signal is modified with either random noise multiplied by a gray-level dependent coefficient or by a predetermined value from a checkerboard or vertical-line pattern. The value from the pattern is dependent upon the gray-level and pixel location of the image data.

The foregoing disclosures illustrate the efforts undertaken to address error diffusion artifacts such as worming. Another category of halftoning techniques is that in which error is not diffused and which incorporates large threshold matrices which are intended to avoid the undesirable patterning of previous "dithering" techniques, which is due to the introduction of energy at low-spatial frequencies to which the human visual system is highly sensitive. This technique also manages to achieve acceptable results. The threshold-matrix design process is intended to produce a resultant image which exhibits the characteristics of so-called "blue noise," as described by Ulicheney, supra. Blue noise patterns have been found desirable for halftoning because the human visual system is less sensitive to these spatial frequencies. It will be appreciated by those of skill in the art that error diffusion is also considered to achieve this goal, albeit in a very different way. Screens have been successfully produced having an aperiodic, uncorrelated structure without low frequency graininess.

U.S. Pat. No. 5,341,228 to Parker et al., for Method and apparatus for halftone rendering of a gray scale image using a blue noise mask, granted Aug. 23, 1994, discloses a halftoning screening method that uses a blue noise mask. The mask was constructed using a frequency domain procedure. The procedure involves repeated high-pass filtering and spatial-domain dot swapping.

U.S. Pat. No. 5,535,020 to Ulichney, for Void and cluster apparatus and method for generating dither templates, granted Jul. 9, 1996, discloses a method of generating a blue noise screen that avoids the iterative frequency-domain approach. This technique is based on spatial-domain dot swapping between the largest voids and largest clusters of threshold values.

U.S. Pat. No. 5,673,121 to Wang, for Stochastic halftoning screening method, granted Sep. 30, 1997, discloses a method for optimizing a stochastic screen by iteratively selecting and manipulating pairs of threshold levels in the stochastic screen matrix. The threshold values are swapped in position if it is determined that a swap would improve an objective metric that is based on inter-pixel distance.

U.S. Pat. No. 5,493,416 to Fan, for Method combining error diffusion and traditional halftoning with arbitrary screen orientation, granted Feb. 20, 1996, describes a system that compensates for errors only in critical blocks.

SUMMARY OF THE INVENTION

A method for reproducing a gray level image in a reduced medium includes a comparison step, a diffusing step, and determining a threshold value for the comparison step from a matrix of threshold values, wherein the matrix has a spatial-chromatic correlated noise pattern.

An object of the invention is to provide a method of adding correlated chromatic noise which, at a magnitude that may be used for prior art white noise techniques, appears less noisy to the human visual system than the white-noise approach.

A further object of the invention is to provide a noise pattern that is correlated both spatially and across output color-planes to resolve the error diffusion artifact problem and the color clustering problem simultaneously.

Another object of the invention is to provide a method of improving the rendition of highlights by producing more uniform dispersion of color dots forming an output image.

These and other objects and advantages of the invention will become more fully apparent as the description which follows is read in conjunction with the drawings.

DETAILED DESCRIPTION OF THE PREFERRED EMBODIMENT

Many of the prior art references describe techniques to resolve the problem of error diffusion (ED) artifacts in gray scale images. Although such techniques may be applicable to color error diffusion, they do not make specific use of the type of color correlation that is described herein. Although the above-described error diffusion and screen-design methods may be effective in reducing some diffusion artifacts, they do not address the problem of colored dot clustering, which may occur when performing color error diffusion. The approach of the invention solves both the error diffusion artifact problem and the color dot clustering problem at once by using a noise pattern that is correlated both spatially and across output color-planes.

The correlated noise pattern of the invention may have the same kind of characteristic of blue noise pattern described in U.S. Pat. Nos. 5,341,228, 5,313,287, 5,535,020, and 5,673,121, however, the screen-design method of the invention differs from the prior art screen-design techniques in the way in which it is constructed. In particular, the method of the invention uses a cross channel mask function to determine the optimal position of a threshold value, versus a frequency-domain approach or a swapping technique of the prior art. The cross-channel mask function incorporates correlations across the set of output color planes to provide a spatial-chromatic correlated noise pattern.

Error diffusion techniques are extensively used in digital printing and copying. A basic error diffusion technique exhibits a number of objectionable artifacts, including "texturing" at mid-tone levels, "worming" in highlight areas, and "edge-melting". The texturing and worming artifacts are caused by the fixed and regular way in which errors are diffused. Edge-melting is caused by the requirement that error must accumulate before ink dots are output. One approach to reducing these artifacts is adding white noise to the input image signal. The drawback of adding noise, of course, is that the resulting image appears noisier. This invention provides a method of adding correlated chromatic noise which, at a magnitude that may be used for prior art white noise techniques, appears less noisy to the human visual system than the white-noise approach. The invention also improves the rendition of highlights because it produces more uniformly dispersed color dots.

Figure 1:
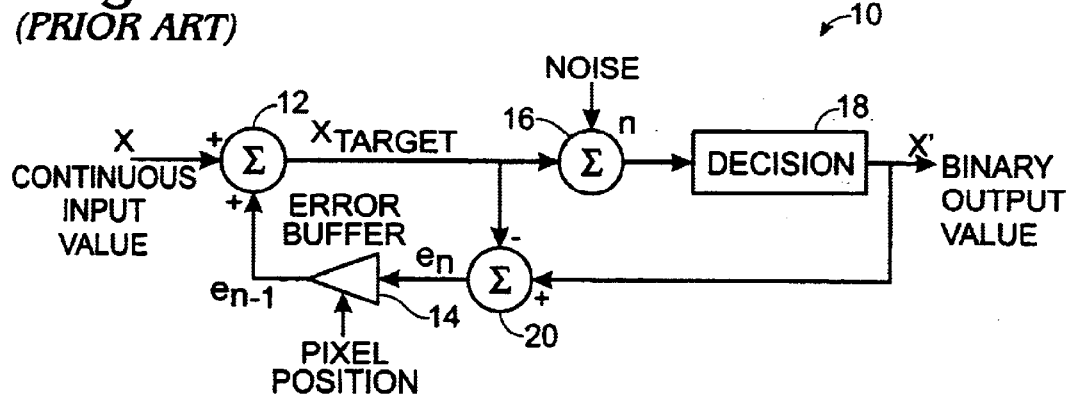
FIG. 1 depicts the prior art technique proposed by Floyd and Steinberg.

FIG. 1 depicts a prior art technique proposed by Floyd and Steinberg, generally at 10. A digital input value, x, is added by an adder 12 to an error signal, $en_{n-1}$, that is propagated from the neighboring, already-processed pixels, which are stored in an error buffer 14. For 8-bit data, the range of input values is from 0 to 255. In some techniques, a noise signal, 'n,' is added by an adder 16 prior to a decision stage 18. In decision stage 18, the signal is converted to a binary output value, x', by comparing the input to a threshold, e.g., 127.5; and an error signal, $e_n$, is computed at 20 as the difference between the output value and $X_{target}$. The error is distributed or "diffused" into error buffer 14, which is used to store the error accumulated from previously processed pixels. An error filter describes the relative weights by which the error is distributed. Frequently, the error filter is referred to as a "weight kernel" or a "weight matrix." Although this ED technique was originally developed for operating on grayscale images, it has been applied to color images by processing each image color plane in turn.

Figure 5A:
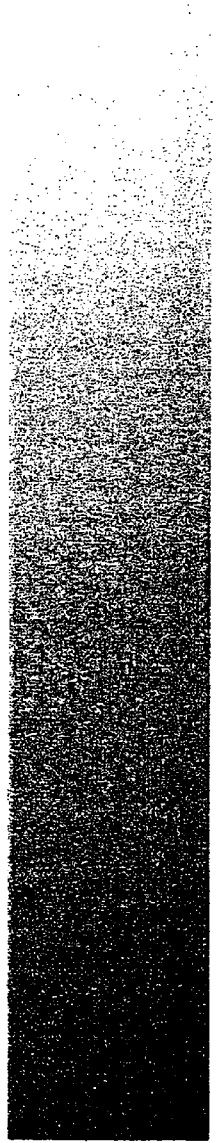
FIGS. 5a–5c depict output of various CMYK images.
Figure 5B:
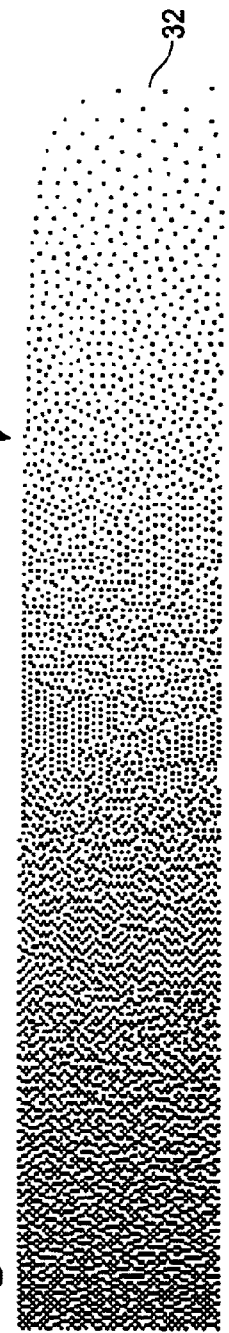

The prior art technique produces images in which several types of artifact are present: "worming," as shown in FIG. 5b at 32, is the perceptual grouping of dots into worm-like patterns. Texture patterns may appear in midtone regions that are very salient edges, as shown in FIG. 5b at 30, of low density patches may appear to trail off, or "melt," edges 32 may shift in location due to a startup delay when processing multiple colored images, dots may lie on top of one another or close enough to be "clumped", leading to a rainy non-uniform appearance. "Noise" may be generated in highlights or large uniformly-colored regions due to the accumulation of small errors over large image areas. Many of these artifacts are due to the way in which errors are accumulated in a region where the target value is substantially below the threshold.

Figure 2:
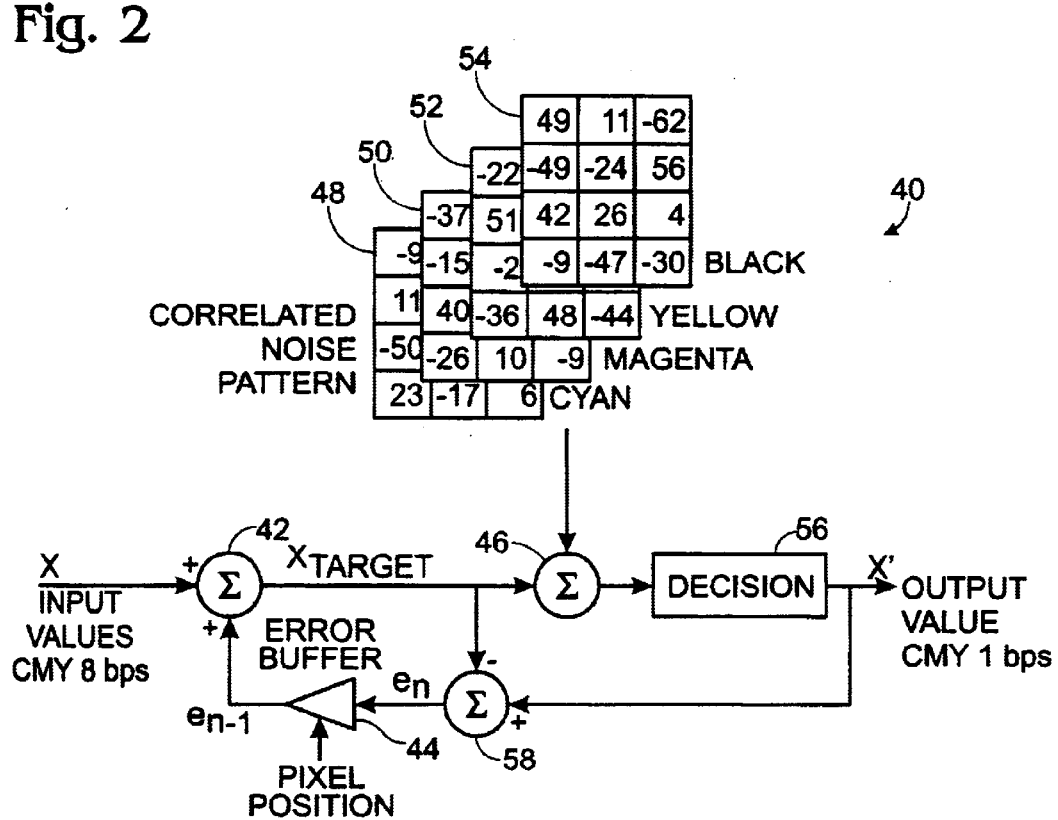
FIG. 2 is a block diagram of the modified error diffusion method of the invention.
Figure 3:
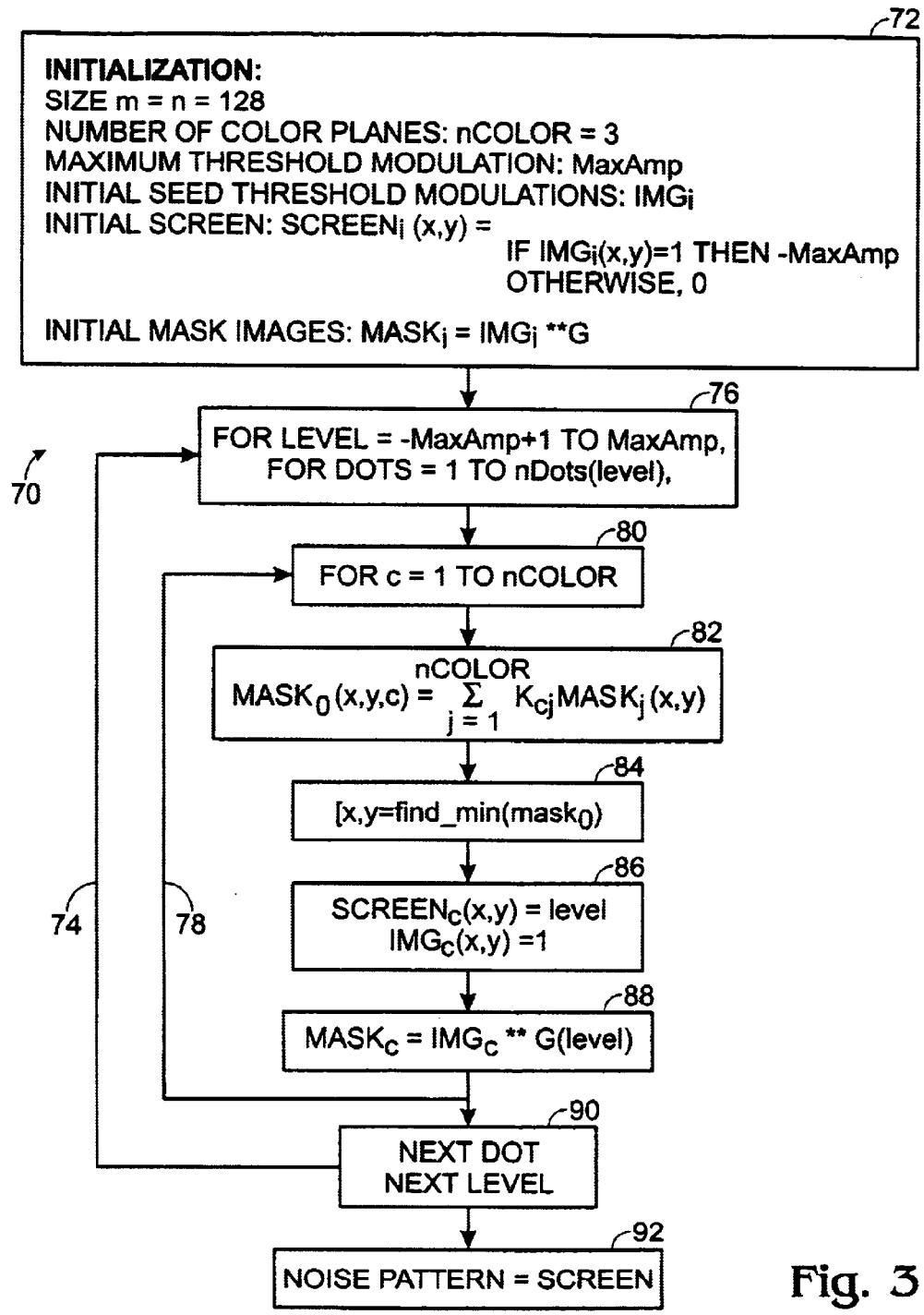
FIG. 3 is a flow chart illustrating the construction of a correlated noise pattern of the invention.

FIG. 2 depicts a schematic of a modified error diffusion technique of the invention, generally at 40. In this method, noise is added to the digital input value, x, prior to reaching the decision stage. This approach has been suggested by Ulichney, supra, as a way to destroy undesirable patterning, particularly by adding in white noise. The draw back of white noise is 1) a noisier appearance at mid-tone levels and 2) an increase in graininess, because no attempt is made to prevent dot-on-dot printing. The approach of the invention is to construct a correlated noise pattern. The correlated color noise is generated using the technique shown in FIG. 3, which will be described later herein. This noise pattern has a fixed size greater than or equal to 32×32 pixels. A larger pattern results in fewer tiling artifacts, however, large patterns require the provision of large memory modules in error diffusion circuits. In the preferred embodiment, a 128×128×4 noise pattern is used. Tiling may be used to cover the whole image. Alternatively, the image may be tiled by selecting from several different noise patterns, either randomly or deterministically. The noise gain is the magnitude of the noise pattern added to the input image. The noise gain may be input level dependent or independent. It will be appreciated that the noise pattern may have configurations other than square, and may be of any requisite size.

The halftoning method of the invention uses an error diffusion technique which incorporates a correlated noise screen. The goal of the noise screen is to produce more-pleasing patterns at highlight levels by biasing pixel placement away from dot-on-dot. The bias also prevents worming artifacts from appearing.

As in the prior art, before applying the correlated noise pattern of the invention, the data from the image is first compared to a threshold value to make a print/no-print decision by a corresponding one of several print values. The one print value is subtracted from the value compared to the threshold to generate a difference. This is referred to herein as a comparison step.

A diffusing step is next performed, which step includes storing at least one of a succession of differences generated by the comparison step and combining at least a corresponding one of the differences with an incoming gray level pixel to form a sum and providing the sum as the summed value of the comparison step, wherein the produced diffused image is characterized by a set of elongated artifacts having a prevailing artifact direction.

Still referring to FIG. 2, each plane in the input image is processed independently. A digital input value, x, is added by an adder 42 to an error signal, $e_{n-1}$, that is propagated from the already-processed pixels, which are stored in an error buffer 44. Correlated noise patterns 48–54 are added by an adder 46 prior to a decision stage 56. In decision stage 56, the signal is converted to a binary output value, x', by comparing the input to a threshold, e.g., 127.5, and an error signal, $e_n$, is computed at 58 as the difference between the output value and $x_{target}$. The error is distributed, or "diffused," into error buffer 44, which is used to store the error accumulated from previously processed pixels. The threshold for each color plane is effectively varied from pixel to pixel according to the noise screen. A threshold deviation is determined from the screen by computing the input pixel position modulo of the screen horizontal and vertical dimensions.

Bi-directional processing is also used by alternating the pixel-processing order between left-to-right and right-to-left. The weight matrix is "flipped" by indexing into it according to the processing direction.

The key to this method is the construction of a spatio-chromatically correlated noise pattern that may break up worming and texturing artifacts without increasing graininess. The correlated noise pattern is constructed using the technique illustrated in FIG. 3, generally at 70. The screen is represented as an m-by-n-by-nColor planes image, where the value at each pixel is the corresponding threshold modulation.

In this embodiment of the pattern generation algorithm, two images are maintained for each color plane: SCREEN records the threshold modulations and IMG records the positions at which threshold modulations have been assigned, with positions set to '1' indicating positions assigned threshold values. The method of generating the correlated noise modulation array is similar to screen generation algorithms used for threshold array halftoning, But where for the screens used in threshold array halftoning an equal number of dots are added for each possible output level, the procedure described herein is more general and permits non-uniform dot profiles as a function of output level. The number of pixels are identified by m and n, while nColor is the number of color planes.

Figure 4:
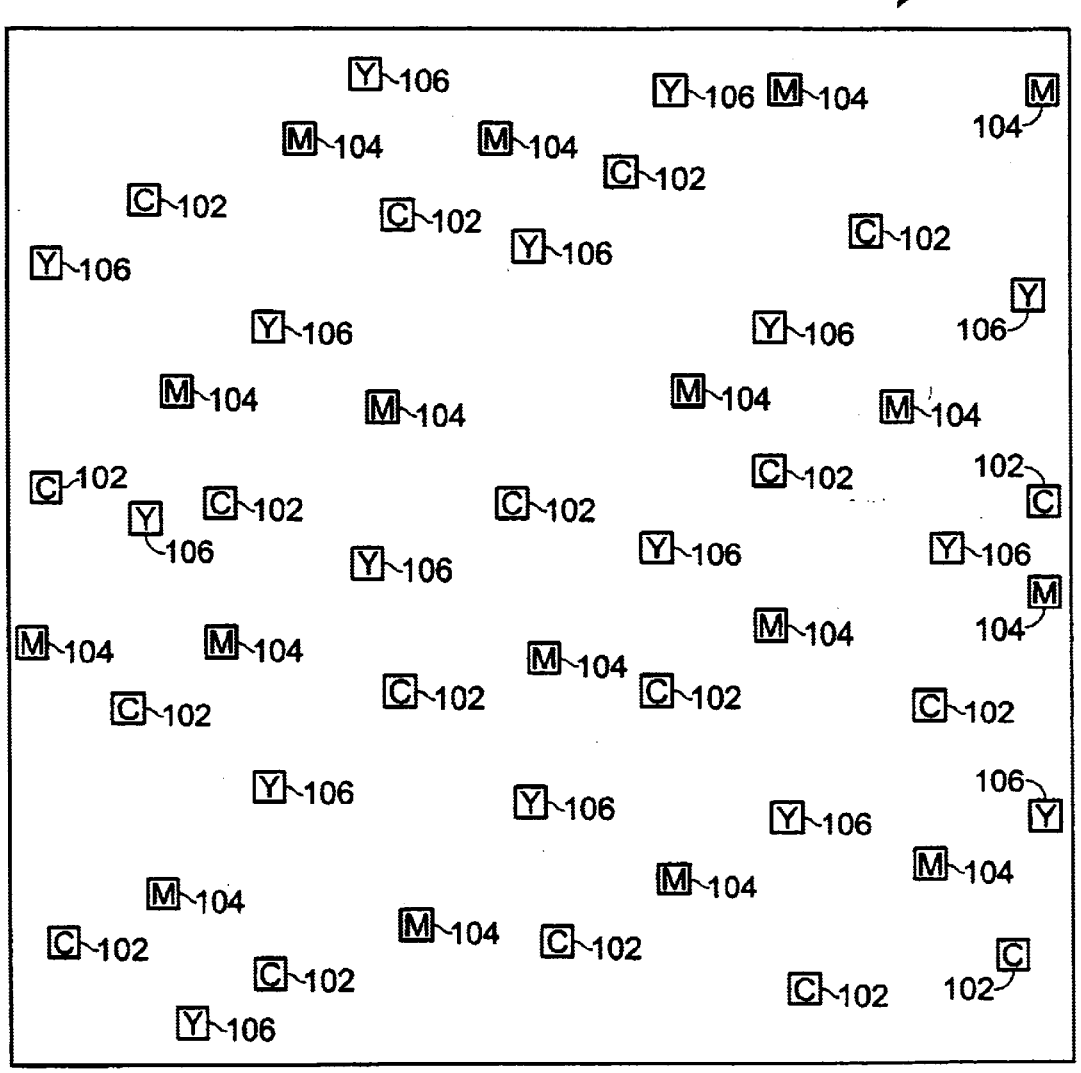
FIG. 4 depicts an initial seed image.

In the first step 72, a number of variables are initialized, including the IMG and SCREEN images. IMG is initialized using a seed image, such as the one shown in FIG. 4 at 100. The goal of the seed image is to achieve good negative spatial correlation between dot planes. The SCREEN images are updated so that the positions corresponding to the values in the seed image are set to the largest negative modulation. In FIG. 4, pixels of three color planes are present, with cyan pixels identified by 102, magenta pixels identified by 104 and yellow pixels identified by 106.

The seed image is manipulated with a function to determine mask values for each color plane. Mask images, $MASK_i$, are computed during initialization 72 and also during each iteration 88. $MASK_i$ is computed by convolving $IMG_i$ by a filtering kernel that decreasingly weights the contribution of pixels more distant from the current pixel. Convolution is denoted by '**'' in the Figure. One function possessing the desired kernel properties is a Gaussian function where the weights are given by $$G(x,y)=\exp(-\{x^2+y^2\}/W) \quad (1)$$

where x and y are positions in the pixel grid relative to the current pixel. W is the kernel standard deviation in pixels.

An outer loop 74 iterates over output levels, initially identified in block 76, and the number of positions to add threshold modulations at each level. An inner loop 78 iterates over color planes, initially identified in block 80. Color correlation is introduced by combining the $MASK_i$ of different color planes to form a composite mask function $MASK_0$, block 82. The coefficients $k_{ij}$ define the relative weightings of the ith and jth color planes. Spatial correlation is introduced by the method of selecting the next pixel for assignment of a modulation value. The location of the minimum in $MASK_0$ is determined, block 84. The element of $SCREEN_i$ corresponding to the minimum is set to the current level; and the corresponding element of $IMG_i$ is set to '1,' block 86. This process is repeated for each color plane, following loop 78, the remaining dots at the current level, and for each of the other levels, block 90, loop 74. The procedure produces a screen image 92 that optimizes the spacing between dots across all color planes, and which provides the correlated noise patterns 48, 50, 52 and 54 of FIG. 2.

Note that the procedure is general because both the levels and number of dots per level may be independently specified. In the preferred embodiment, the standard deviation of the filter kernel, W, is set to the average distance between dots and is therefore a function of level. The weights $k_{ij}$ are equal to 0.4 when i=j (within channel) and 0.3 when i≠j (between channels). These weightings lead to a stronger negative spatial correlation between dots within color channels than dots between color channels. Other weightings are also possible. Other embodiments include using a non-Gaussian, monotonically decreasing function as the kernel or varying the method for computing the combined mask image.

Figure 5C:
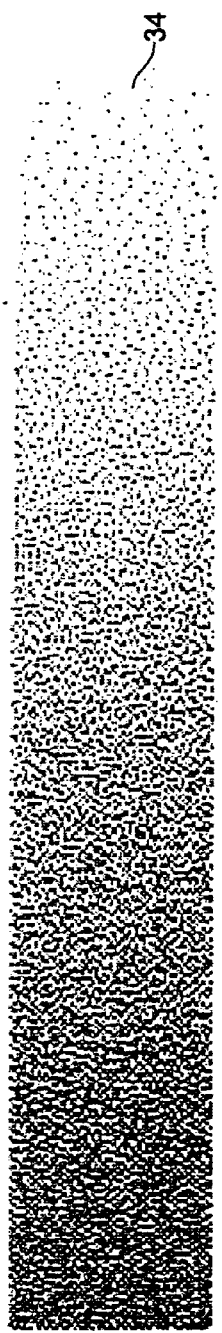

The correlated noise pattern significantly reduces all the artifacts mentioned above. Mid-tone texturing and worming are destroyed by the noise pattern without the penalty of graininess associated with spatially correlated blue noise. Color clustering is greatly reduced because the threshold modulation is biased by the correlated noise pattern, thereby favoring one color over the others. The startup delay artifact is alleviated since the threshold is reduced at certain positions. These improvements are depicted in FIG. 5. The initial target is depicted in FIG. 5a. The ramp processed by using Floyd-Steinberg algorithm and weight matrices, and is shown in FIG. 5b. When noise is not added, patterning is visible for the Floyd-Steinberg algorithm and significant edge melting and worming 32, and texturing 30, are present. Because the values at each input pixel are equal and because the Floyd-Steinberg algorithm processes each color plane in exactly the same way, pixels in the output image appear black because C, M, and Y values are in register. The result of the method of the invention is shown in FIG. 5c, where it may be seen that the method of the invention eliminates texturing and worming. At normal viewing distances for a 600-dpi output, the reduction in color clustering also leads to a more pleasing, less noisy dot pattern. The melted-edge problem is clearly visible in the processed grayscale ramp image of FIG. 5b, but is reduced when the correlated noise is added according to the invention, FIG. 5c, at 34.

The preferred embodiment is implemented in software. The same technique may be implemented in an application specific integrated circuit (ASIC) or in a field programmable gate array (FPGA). It may also be implemented in digital signal processor (DSP) using micro codes. The technique may be incorporated into a printer driver.

Although a preferred embodiment of the invention has been disclosed, it will be appreciated that further variations and modifications may be made thereto without departing from the scope of the invention as defined in the appended claims.

We claim:

1. A method for reproducing a gray level image in a bi-tonal medium, comprising:
   a comparison step comprising (a) comparing a summed value with a threshold value to make a print or no print decision characterized by a corresponding one of two print values, and (b) subtracting said corresponding one print value from said summed value to generate a difference;
   a diffusing step comprising (a) storing at least one of a succession of differences generated by said comparison step and (b) combining at least a corresponding one of said differences with an incoming gray level pixel to form a sum and providing said sum as said summed value of said comparison step, wherein said produced diffused image is characterized by a set of elongate artifacts having a prevailing artifact direction;
   determining said threshold value of said comparison step from a matrix of threshold values, the matrix having a spatial-chromatic correlated noise pattern.

2. The method of claim 1 which further includes:
   inputting a color image wherein the colors are represented by dots and wherein the colors are divided into correlated color planes;
   initializing a seed screen image;
   manipulating the seed image with a function to determine mask values for the color planes;
   constructing a noise pattern dot-by-dot and color plane-by-color plane for each color in the seed screen image;
   correlating colors by a cross channel mask function wherein the mask function of one color plane is used to determine the mask function for the other color planes thereby minimizing dot overlay; and
   outputting a noise pattern screen from the color correlated seed screen image.

3. The method of claim 2 wherein said manipulating includes applying a Gaussian function formed from the relative positions of dots in the seed screen image and the average cell size.

4. The method of claim 2 wherein said manipulating includes applying a Gaussian function $$Gaus = \exp\left(-\frac{x^2 + y^2}{W}\right)$$

wherein x and y are the relative positions of dots in the seed screen image and W is one-half the average cell size.

5. The method of claim 2 wherein said inputting a color image includes dividing the colors into four correlated color planes.

6. The method of claim 1 which includes modulating the threshold values.

7. A method for reproducing a gray level image in a bi-tonal medium, comprising:
   a comparison step comprising (a) comparing a summed value with a threshold value to make a print or no print decision characterized by a corresponding one of two print values, and (b) subtracting said corresponding one print value from said summed value to generate a difference,
   a diffusing step comprising (a) storing at least one of a succession of differences generated by said comparison step and (b) combining at least a corresponding one of said differences with an incoming gray level pixel to form a sum and providing said sum as said summed value of said comparison step, wherein said produced diffused image is characterized by a set of elongate artifacts having a prevailing artifact direction;
   determining said threshold value of said comparison step from a matrix of threshold values, the matrix having a spatial-chromatic correlated noise pattern, which is generated by:
      inputting a color image wherein the colors are represented by dots and wherein the colors are divided into four correlated color planes;
      initializing a seed screen image;

manipulating the seed image with a function to determine mask values for the color planes;

constructing a noise pattern dot-by-dot and color plane-by-color plane for each color in the seed screen image;

correlating colors by a cross channel mask function wherein the mask function of one color plane is used to determine the mask function for the other color planes thereby minimizing dot overlay; and outputting a noise pattern screen from the color correlated seed screen image.

8. The method of claim 7 wherein said manipulating includes applying a Gaussian function formed from the relative positions of dots in the seed screen image and the average cell size.

9. The method of claim 7 wherein said manipulating includes applying a Gaussian function $$Gaus = \exp\left(-\frac{x^2 + y^2}{W}\right)$$

wherein x and y are the relative positions of dots in the seed screen image and W is one-half the average cell size.

10. The method of claim 7 which includes modulating the threshold values.

11. A method of halftoning multi-bit color images, comprising:

inputting a color image wherein the colors are represented by dots and wherein the colors are divided into correlated color planes;

initializing a seed screen image;

manipulating the seed image with a function to determine mask values for the color planes;

constructing a noise pattern dot-by-dot and color plane-by-color plane for each color in the seed screen image;

correlating colors by a cross channel mask function wherein the mask function of one color plane is used to determine the mask function for the other color planes thereby minimizing dot overlay; and outputting a noise pattern screen from the color correlated seed screen image.

12. The method of claim 11 wherein said manipulating includes applying a Gaussian function formed from the relative positions of dots in the seed screen image and the average cell size.

13. The method of claim 11 wherein said manipulating includes applying a Gaussian function $$Gaus = \exp\left(-\frac{x^2 + y^2}{W}\right)$$

wherein x and y are the relative positions of dots in the seed screen image and W is one-half the average cell size.

14. The method of claim 11 wherein said inputting a color image includes dividing the colors into four correlated color planes.

15. The method of claim 11 which includes modulating the threshold values.

* * * * *